United States Patent [19]

Dortch et al.

[11] 4,077,645

[45] Mar. 7, 1978

[54] TRAILER ASSEMBLY AND CONNECTOR UNIT THEREFORE

[75] Inventors: Charles W. Dortch; Donald K. Vaught, both of Houston, Tex.

[73] Assignee: George C. Ballas, Sr., Houston, Tex.

[21] Appl. No.: 697,677

[22] Filed: Jun. 18, 1976

[51] Int. Cl.² .............................................. B62K 27/00
[52] U.S. Cl. ..................................... 280/204; 280/511; 280/720; 280/763
[58] Field of Search ............... 280/204, 400, 492, 494, 280/511, 513, 763, 720, 63, 47.26, 47.33

[56] References Cited

U.S. PATENT DOCUMENTS

| 384,402 | 6/1888 | Teal | 280/720 |
|---|---|---|---|
| 2,207,812 | 7/1940 | McClellan | 280/763 |
| 2,468,894 | 5/1949 | Peek | 280/204 |
| 2,696,392 | 12/1954 | Case | 280/513 |
| 2,980,442 | 4/1961 | Krokos | 280/204 |
| 3,271,048 | 9/1966 | Beesley et al. | 280/204 |
| 3,494,667 | 2/1970 | Schlapman et al. | 280/47.26 X |
| 3,747,955 | 7/1973 | MacAlpine | 280/204 |

FOREIGN PATENT DOCUMENTS

| 2,248,971 | 5/1975 | France | 280/204 |
|---|---|---|---|
| 825,809 | 4/1952 | Germany | 280/204 |

*Primary Examiner*—Joseph F. Peters, Jr.
*Assistant Examiner*—John A. Pekar
*Attorney, Agent, or Firm*—Bard, Springs, Jackson & Groves

[57] ABSTRACT

A trailer assembly for a two-wheel vehicle including a compact body portion carried and supported by wheels, an easily attachable and detachable connector assembly for attaching the trailer to the vehicle, and a kick-stand unit for facilitating ease of handling of the trailer.

5 Claims, 19 Drawing Figures

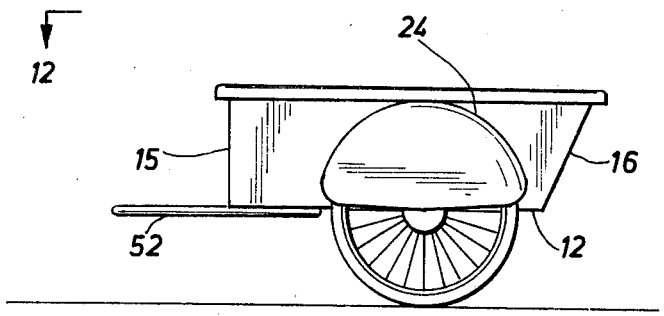
FIG. 11
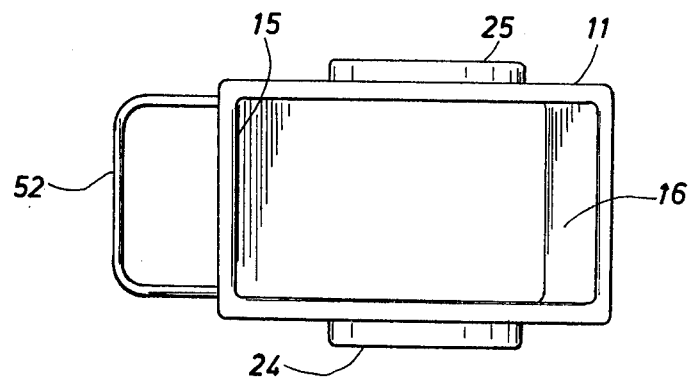
FIG. 12
FIG. 13
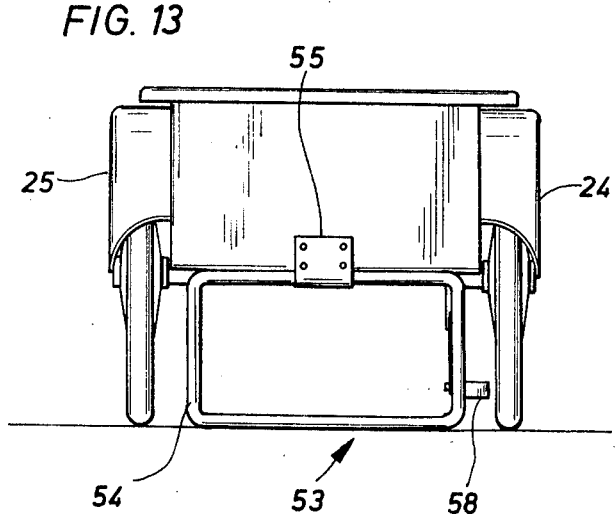
FIG. 14
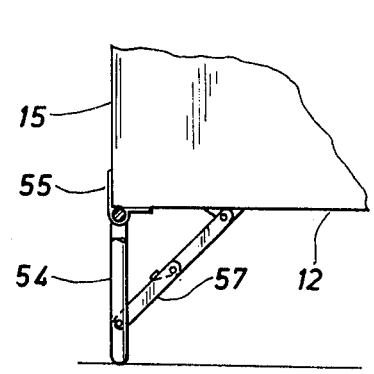
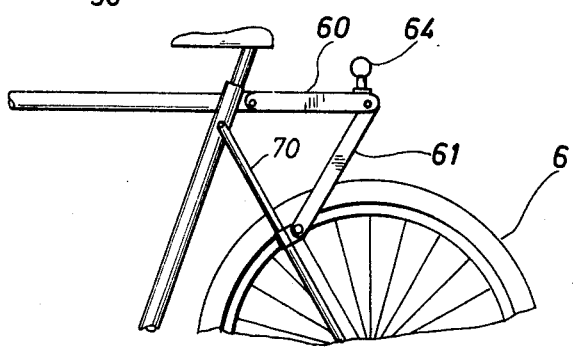
FIG. 15

TRAILER ASSEMBLY AND CONNECTOR UNIT THEREFORE

This invention relates to non-powered carts, trucks and other types of vehicles intended to be drawn by a suitable prime mover, and more particularly relates to trailers designed to be towed by bicycles, motorcycles and other types of powered two-wheel vehicles.

The use of bicycles and motorcycles has recently become increasingly popular for travel over extended distances as well as for limited journies. Thus, a cyclist is often on the road for periods as long as overnight and weekend trips, as well as for short intervals such as required for travel between home and office.

A short trip does not usually require the rider to burden himself with any significant amount of baggage, but this is not the case for trips extending overnight or through a weekend. On the other hand, a bicycle or motorcycle is not suitable to carry much more than its rider. Attempts have been made to meet this deficiency in two-wheeled vehicles, by providing racks and other assemblies whereby larger baggage may be strapped to the bicycle. However, such devices are inherently unsuitable, since they necessarily support their loads in a manner to contribute to instability of the bicycle.

It will be apparent that these disadvantages may be overcome with a trailer which is adapted to be connected to a two-wheel vehicle, and which will thereby shift such instabilizing loads from the bicycle to a better and more convenient or suitable location. Since a basic feature of any two-wheel variety of vehicle is its extreme maneuverability, ease of handling, and its capability of travel in tight places, it also follows that any trailer to be towed by a bicycle must also demonstrate these same characteristics.

Furthermore, it will be apparent that any trailer suitable for these purposes must not only itself be easy to maneuver, easy to handle, and capable of movement in tight places, but it must not limit or detract from such capabilities with respect to the bicycle itself.

More particularly, bicycles and other two-wheel vehicles do not remain vertical to the ground during travel but bank or tilt from vertical due to natural balance in the course of riding this type of vehicle. It is therefore desirable to provide a trailer assembly for securing to a two-wheel vehicle, which assembly tracks behind the vehicle and provides no noticeable effect on the natural balance in riding, cornering or banking.

In accordance with the present invention, a trailer assembly for a two-wheel vehicle is provided, which assembly includes a body portion of compact design carried and supported by a pair of wheels, a connector assembly for attaching the trailer to the vehicle, and a kick-stand assembly to facilitate ease of handling of the trailer.

Accordingly, it is a principal feature of this invention to provide a trailer assembly particularly adapted for use with two-wheel vehicles. A further feature is to provide a sturdy and yet light-weight trailer assembly simple in construction and economical to manufacture.

A still further feature is to provide a trailer assembly for two-wheel vehicles suitable for trailering light or heavy loads with ease and with minimum effect of the weight of the load.

A further feature of this invention is to provide a trailer assembly for two-wheel vehicles that is so constructed and arranged as to be readily convertible into a wheelbarrow.

Another feature of this invention is to provide a trailer assembly for a two-wheel vehicle which includes hanging seats for the accommodation of passengers.

Yet another feature of this invention is to provide a trailer assembly for a two-wheel vehicle that includes a kick-stand unit for providing stability to the assembly.

A further feature is to provide a connector assembly for attaching a trailer to a two-wheel vehicle, which connector allows the vehicle to freely maneuver while cornering or banking.

A further feature of this invention is to provide a connector assembly for attaching a trailer to a two-wheel vehicle, which connector is adapted to be quickly and easily attached or detached in use.

These and other features and advantages of the present invention will become more apparent from the following detailed description thereof when considered in the light of the accompanying drawings, in which said drawings:

FIG. 11 is a simplified perspective of the trailer of FIG. 1 showing an embodiment thereof including a secondary handle member adapted to convert the unit into a wheelbarrow;

FIG. 12 is a simplified top plan view taken along line 12—12 of FIG. 11;

FIG. 13 is a front elevational view of the trailer of FIG. 1 showing an embodiment thereof including a kick-stand leveling assembly;

FIG. 14 is a side view of a portion of the assembly depicted in FIG. 13;

FIGS. 15 and 16 illustrate the hitch assembly of the present invention with parts broken away for clarity.

Figure 1:
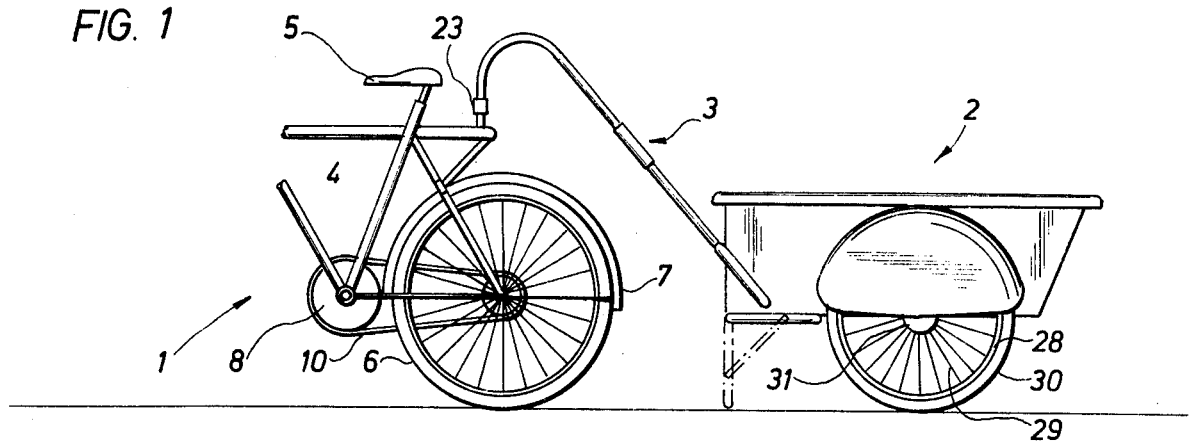
FIG. 1 is a side elevational view of a typical bicycle and trailer operatively connected thereto.

Referring to the drawings in detail and more particularly to FIG. 1, a two-wheel vehicle 1 is there shown and is of the type having wheels arranged in tandem, such as, for example, a bicycle. A trailer 2 embodying the novel features of the present invention is also shown, and the attachment connector assembly 3 for hitching the trailer to the vehicle.

The vehicle 1 illustrated only partially, and only by way of example, comprises several well-known structural features of a frame member 4, for example. The frame member 4 carries seat 5, drive wheel 6 and fender 7. To the frame is rotatably mounted sprocket 8. A pedal is fixedly related to sprocket 8 to drive same. Rotational motion is transmitted to drive wheel 6 via chain drive member 10. Since the vehicle forms no particular feature of the present invention, further details thereof will be omitted. Other prime movers may be substituted therefore, for example mini-bikes, motor scooters, motorcycles, tricycles, tractors and lawnmowers, the only prerequisite being that the prime mover possess a power source or power train sufficient to pull the trailer of the present invention from place to place.

Figure 2:
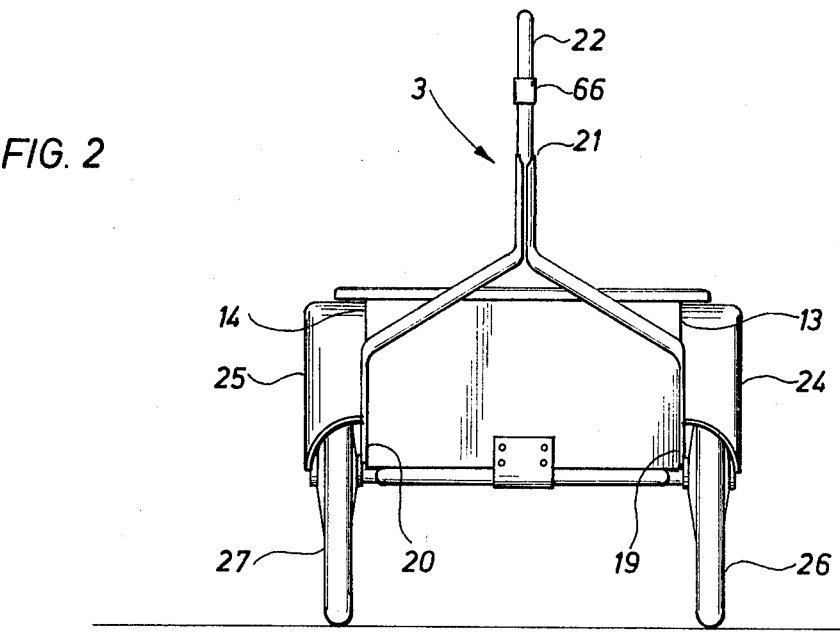
FIG. 2 is a front elevational view of the trailer as shown in FIG. 1.
Figure 3:
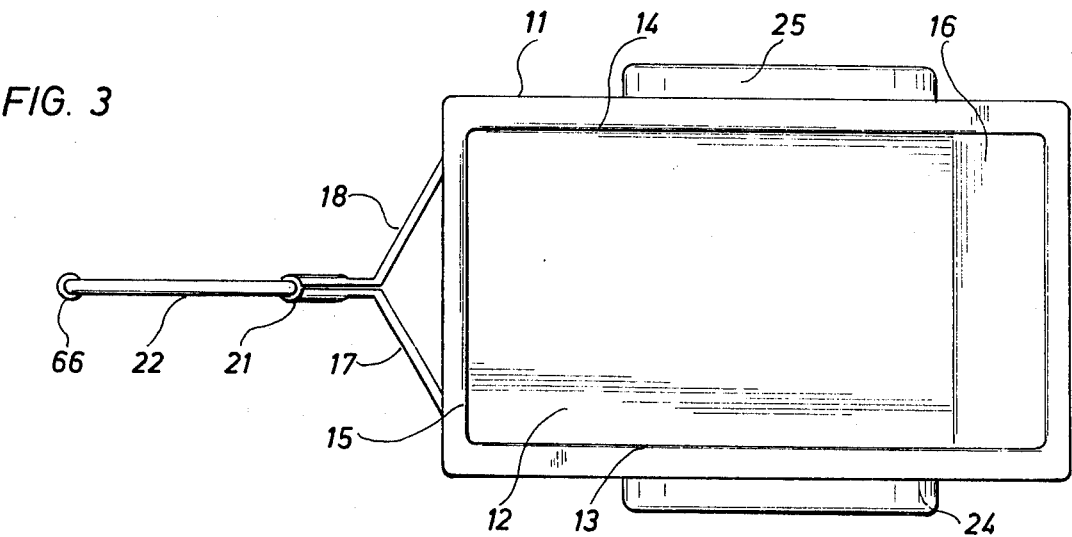
FIG. 3 is a top plan view of the trailer shown in FIG. 1.
Figure 4:
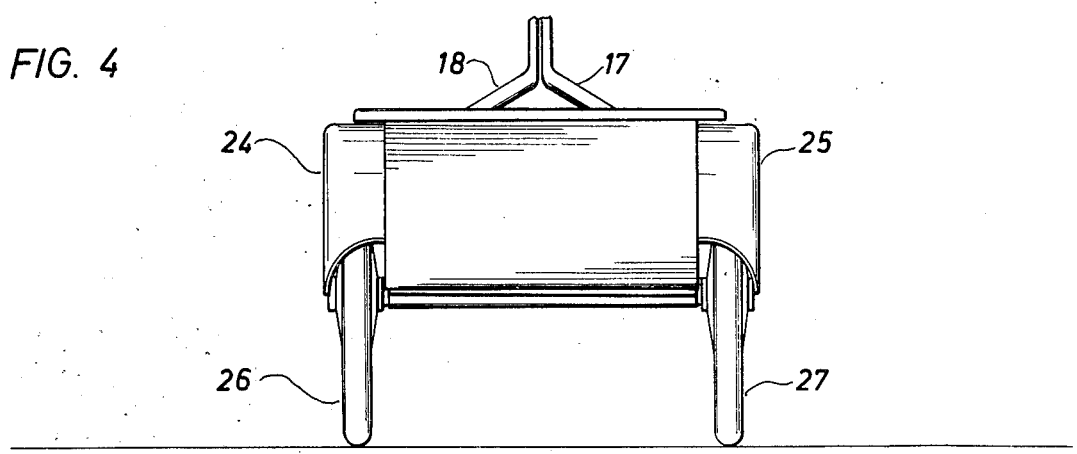
FIG. 4 is a rear elevational view of the trailer shown in FIG. 1.

As can be seen in FIGS. 2 - 4, the trailer according to the present invention includes a body unit 11. The body unit includes a bottom wall 12 and a plurality of upstanding walls. Numerals 13 and 14 indicate side walls. The front wall of the body unit is shown at 15, and the numeral 16 indicates the rear wall. Rear wall 16 is sloped in a direction away from front wall 15. The function of this sloping rear wall 16 will be apparent from the discussion below regarding the embodiment of FIGS. 11 and 12.

A connector assembly 3 is attached to the body unit 11 of the trailer and constitutes the means for attaching the trailer to the vehicle behind which the trailer is to track. The connector assembly 3 is shown in detail in FIGS. 1 - 3 and is seen to include a first elongated member 17 and a second elongated member 18. These elongated members are preferably releasably attached to the body unit side walls at one end thereof at 19 and 20. As shown in FIG. 2, the elongated members 17 and 18 converge upwardly from the body unit side walls 13 and 14 and terminate at point 21. From here, the elongated members are joined to a third elongated member 22. This third member is likewise elongated and further is seen in FIG. 1 to take the shape of a gooseneck-like configuration. The particular shape of this member as shown facilitates ease of connecting the hitch assembly to the vehicle, as well as allowing for passage over the rear fender of the vehicle which is to tow the trailer unit. As seen in FIG. 1, the socket portion 23 of the hitch unit is carried by the terminal end portion of the goosenneck-like elongated member 22. Members 17 and 18 may be releasably attached to side walls 13 and 14 by any suitable release attachment means at points 19 and 20.

As shown in FIGS. 1 - 3, a pair of fender members 24 and 25 extend from the body unit side walls 13 and 14 and function to prevent the flinging of water, dirt, mud or snow from the wheels 26 and 27 of the trailer unit when under tow.

A pair of wheels 26 and 27 are provided as illustrated in FIGS. 1 and 2, for example. These wheels in the preferred embodiment of the invention comprise gearless front bicycle wheels which include a rim member 28 having numerous radially extending spokes 29. An inflatable tire 30 surrounds rim member 28 and may comprise either a nylon tire or a conventional rubber tire. The central collar member 31 is typically of the non-threaded type adapted to be received upon an axle member and rotatably mounted with respect thereto by conventional bearings, bushings and packings.

Figure 5:
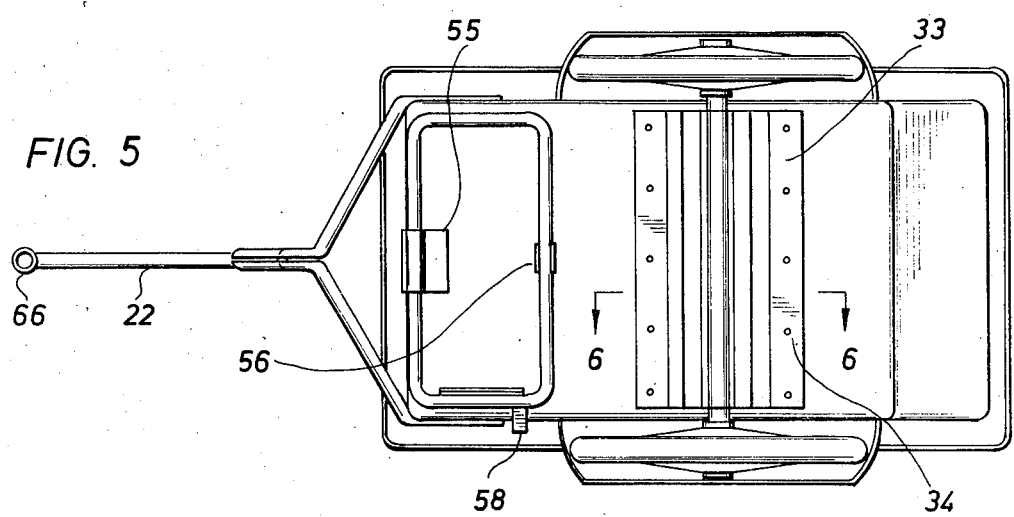
FIG. 5 is a bottom plan view of the trailer shown in FIG. 1.
Figure 6:
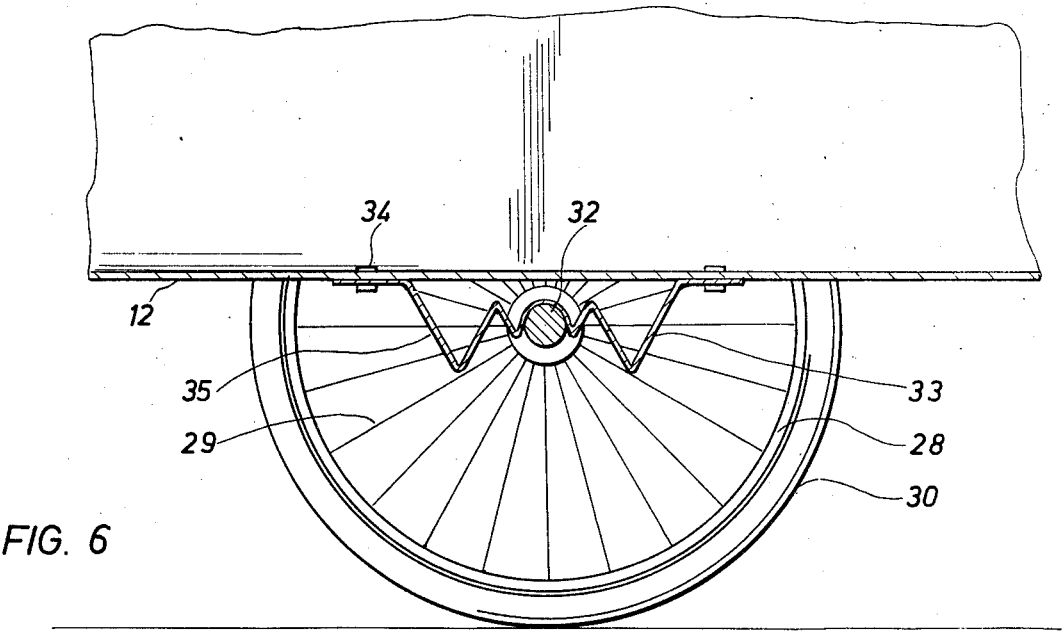
FIG. 6 is a side elevational view along line 6—6 of FIG. 5.

In FIGS. 5 and 6 are shown the details of the assembly for mounting the axle 32. The mounting system is seen to include an elongated bracket member 33 attached to the bottom wall 12 of the body unit. Suitable attachment elements 34 extend along each side of the bracket member and secure the member to the bottom wall. The bracket member 33 includes a plurality of V-shaped or notched sections 35 which provide a resilient shock-absorbing member. This member, as will be apparent, is capable of resiliently yielding in directions toward and away from the bottom wall. If desired, rubber bumpers or other conventional cushioning devices may be interposed between the bottom wall and the bracket member to further absorb the shock, as may be the case when bottoming out occurs.

The axle is suitably received in notched relationship to bracket member 33 and is attached thereto by suitable means such as U-bolts. It will thus be seen that as the axle is deflected upwardly or downwardly as the case may be by one or both of the wheels attached thereto, the bracket member flexes to accommodate such deflecton.

Figure 7:
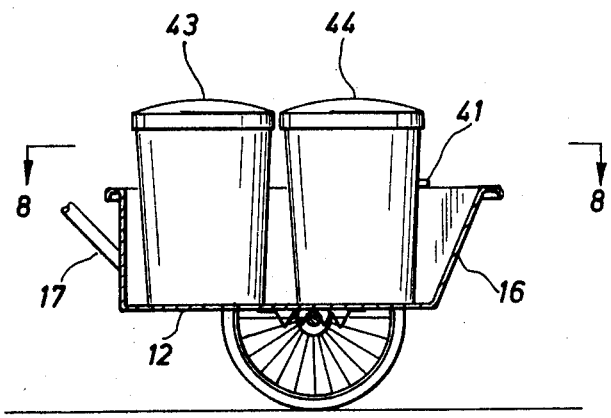
FIG. 7 is a simplified side elevational view of the body unit of the trailer of FIG. 1 and illustrating an embodiment of the invention including a holding bar member.
Figure 8:
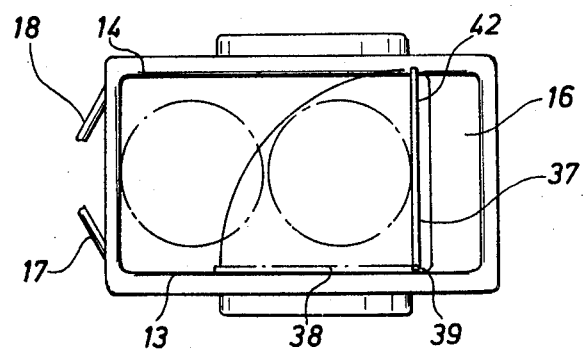
FIG. 8 is a simplified top plan view taken along line 8—8 of FIG. 7.

In FIGS. 7 and 8, is shown a detail of an embodiment of the present invention which is seen to include an elongated holding bar member 37 attached at end 38 by means 39. The end 38 of bar 37 is preferably attached to side wall 13 of body unit 11 so as to pivotably mount the bar for movement between side walls 13 and 14. Thus, when not in use the bar member lies alongside side wall 13 and is held thereto by a fastener. The opposite side wall 14 includes a retainer 41 for receiving end 42 of bar member 37. When it is desired to use bar member 37, end 42 of the bar member is removed from the fastener and swung across and received in retainer 41. Retainer 41 holds bar member 37 rigidly between side walls 13 and 14. The bar member 37 when so fixed functions to prevent items in body unit 11 from tumbling over into the slanted rear wall 16 when the trailer is moved about. Thus, in FIG. 7 is shown the body unit of the trailer assembly loaded with two trash cans 43 and 44, for example. As will be apparent, bar member 37 is moved to its position extending between side walls 13 and 14, and hence upon forward movement of the trailer assembly the momentum produced thereby does not cause the cans to tilt or fall into the vacant space defined by rear wall 16. Rather, bar member 37 retains the cans or other items carried in upright position during movement of the trailer assembly from point to point during use. Upon unloading of the trash cans from the trailer, bar member 37 is removed from retainer 41 and swung back to side wall 13 and placed in the fastener.

Figure 9:
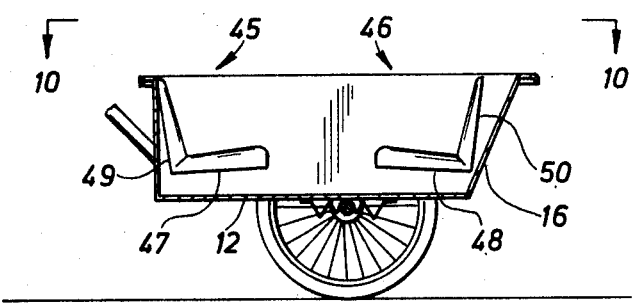
FIG. 9 is a simplified side elevational view of the body unit of the trailer of FIG. 1 and illustrating a seating arrangement embodiment of the present invention.
Figure 10:
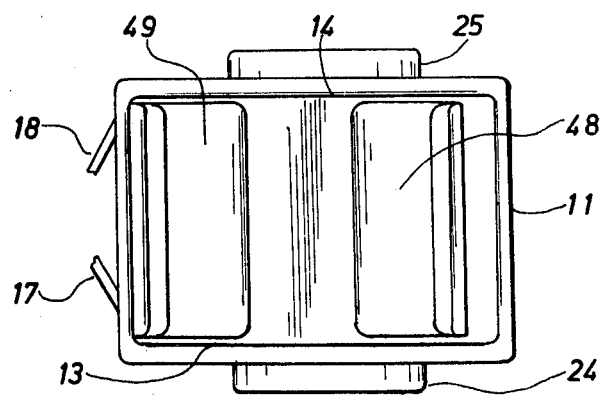
FIG. 10 is a simplified top plan view taken along line 10—10 of FIG. 9.

A further embodiment of the trailer assembly of the present invention is illustrated in FIGS. 9 and 10. Included therein are a pair of seat members 45 and 46 with bottom sections 47 and 48 and upright sections 49 and 50 forming support surfaces adapted to carry one or more passengers. Sidewalls 13 and 14 and bottom wall 12 include suitable means for removably mounted both seat members 45 and 46 within body unit 11. When the trailer is to be used to carry passengers, children for example, the seat members 45 and 46 are inserted into body unit 11. At the termination of use of the trailer as a passenger carrier, the seat members 45 and 46 are removed, and the trailer again may be used for hauling other types of materials. The means for removably mounting the seat members should be of such construction to allow the seat sections 45 and 46 to be slipped into the body unit 11 when in use and to be removed therefrom when not in use. It is contemplated that this seat embodiment of the trailer assembly will provide hours of enjoyment for children in being trailered about the neighborhood by a bicycle attached thereto. The seats are sized to accomodate two pair of children in face to face relationship, although one child on each side may be trailered. Preferably, the occupants should be equally distributed on each side in order to avoid putting stress on gooseneck-like member 22 due to unequal weight distribution fore or aft.

In still another embodiment of the present invention, as illustrated in FIGS. 11 and 12, there is shown a trailer assembly including a secondary handle 52 of curved configuration and attached to bottom wall 12. The function of the handle member 52 is to push body unit 11 to and fro and to tilt the body unit 11 to dump material therefrom along slanted rear wall 16. It is necessary, however, to first remove the detachable connector assembly 3 from body 11 so as not to interfere with the manipulation of body unit 11 as a wheelbarrow, for example. Thus, as explained above in connection with FIGS. 1 - 3, the connector assembly is easily and releasably attached to body unit 11, and hence the connector assembly 3 including the three elongated members 17, 18 and 22 may be quickly released from body unit 11 and laid aside. The body unit 11, thus freed of outwardly extending protuberances, may be manipulated via handle member 52 in the fashion of a wheelbarrow. Thus it can be used to perform many useful functions about the home or garden, as will be apparent. When it is desired to reconvert the assembly of FIGS. 11 and 12 for trailering functions, it is simply necessary to reattach connector assembly 3 to the body unit 11. Thus there is provided a trailer device which, when simply modified, provides a wheelbarrow-like unit.

FIGS. 13 and 14 illustrate still another embodiment of the present invention including therein a kick-stand assembly 53 for leveling the body unit 12 when at a standstill. This assembly 53 is usable with any of the above described embodiments, the main function of the assembly 53 being to provide a support for the body unit 11 to maintain the unit in a level relationship when stationary. To this end, there is seen a closed-loop rectangularly shaped configuration 54 comprising the weight supporting member of the kick-stand assembly. This member 54 is suitably mounted to front wall 15 of body unit 11 by means of a mounting bracket 55. The bracket receives and mounts member 54 for pivotal movement between a substantially vertical position when in use to a position substantially parallel to the bottom wall 12 of body unit 11 when not in use. Thus, when desired to support body unit 11 in a level plane when at a standstill, member 54 is positioned as shown in FIG. 13. When body unit 11 is to be moved about, member 54 is pivoted upwardly to a position adjacent body unit bottom wall 12 as shown in FIG. 5. A suitable clip element 56 is provided in bottom wall 12 to maintain member 54 in this relationship when not in use. When in its vertical position, a locking arm 57 cooperates with member 54 to support the member in its vertical disposition for load bearing. Numeral 58 indicates a foot peg member attached to member 54 and extending therefrom. The foot peg 58 enables the kick-stand assembly 53 to be moved upwardly into its inoperative position by the foot of the person using the device. Pressure applied by the foot against foot peg 58 moves member 54 upwardly into engagement with clip 56 until needed. The reverse procedure is used to move member 54 into operative position again.

The body unit of the assemblies illustrated and explained above is preferably constructed of a plastic material, although other suitable materials such as wood or metal may be used. Plastics are preferred due to their light weight and unitary features of construction.

The various assemblies and brackets referred to above, including the connector assembly 3, kick-stand assembly 53, holding bar member 37, handle member 52, and the hardware associated therewith, are preferably constructed of metal, stainless steel being preferred due to appearance. However, other conventional metal materials of construction may be used.

The seats described in the embodiment of FIGS. 9 and 10 are also preferably constructed of plastic as above, and a unitary construction is contemplated herein. Again, wood or metal materials may be used.

In selecting constructional materials, it is the aim of the invention herein to produce an assembly simple to construct, lightweight and inexpensive to manufacture.

Figure 16:
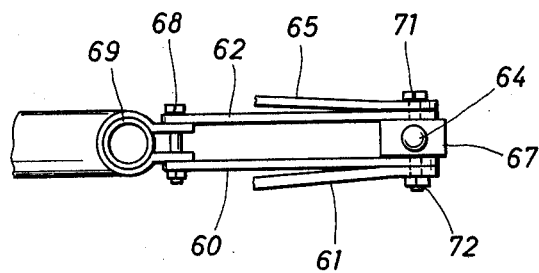

Referring to FIGS. 15 and 16, are shown the details of the hitch assembly for mounting the trailer unit to a conventional bicycle which is to tow the unit. More particularly, a first pair of brace members 60 and 62 are attached at 68 to the post member 69 of the bicycle. A second pair of brace members 61 and 65 are seen which interconnect with members 60 and 62 at one end, and with elements 70 (only one being shown in FIG. 15) of the bicycle frame. The ball connection member 64 is removably mounted on a block element 67 which is fixedly secured to the junction of the pairs of brace members as shown at 71 and 72. Thus, the brace mounting assembly of FIGS. 15 and 16 provides a level and rigid platform for carrying the ball member 64 of the hitch connection assembly.

Figure 17:
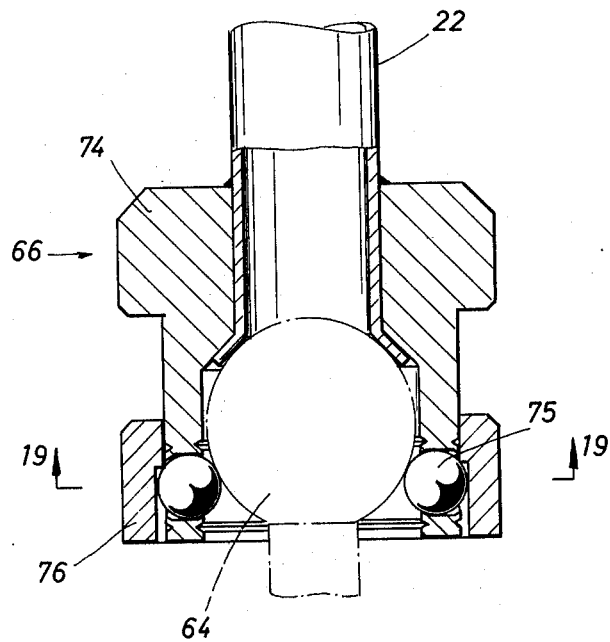
FIGS. 17 - 19 illustrate the details of the socket connection of the hitch assembly.
Figure 18:
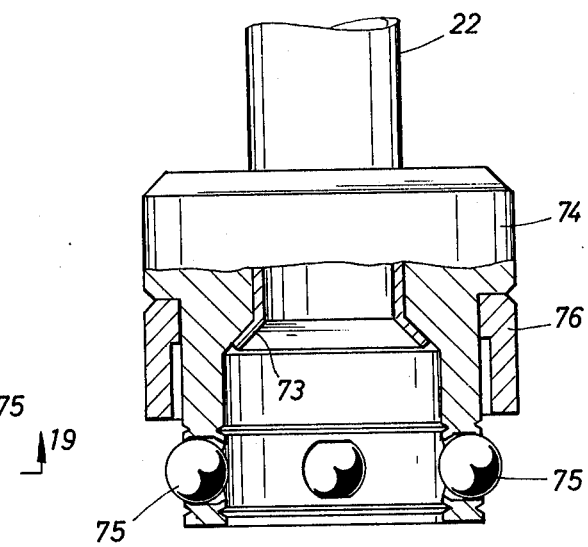
Figure 19:
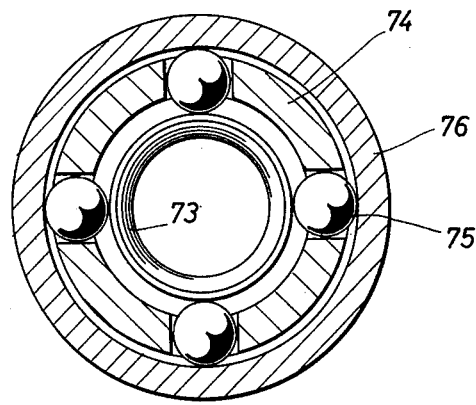

The socket portion of the connection assembly is shown in FIGS. 17 - 19 and will be seen to include a collar connector generally indicated at 66 and carried by the lower end of gooseneck member 22. Connector 66 carries within its confines the socket portion which is received on ball element 64. The socket portion terminates in a bevel shown at 73 which rides on the top surface of ball element 64. More particularly, connector 66 includes a first stationary sleeve 74 which includes bevel portion 73. This sleeve 74 extends downwardly from member 22 and terminates at its lower portion with a series of ball bearing elements 75 movable within the lower portion of sleeve 74. Received about sleeve 74 is a second collar member 76 which is slidably mounted on sleeve 74. Thus, FIG. 17 shows the collar 76 in its lower position, while the upper position of collar 76 is illustrated in FIG. 18. The lower position of collar 76 in FIG. 17 compresses ball-bearing elements 75 inwardly of sleeve 74, which inward movement of elements 75 locks assembly 66 about ball element 64. Thus, the assembly 66 with element 76 in its upper position as in FIG. 18 is placed over ball element 64. Collar 76 is then slipped to its lower position as shown in FIG. 17. This downward movement of collar 76 forces ball-bearing elements inwardly toward the lower segment of ball element 64 and thus prevents assembly 66 from moving upwardly and off of ball element 64. It should be apparent that to disconnect assembly 66 from ball element 64 it is simply necessary to slip collar 76 to its upward location as in FIG. 18. This allows ball-bearing elements 75 to move outwardly of the lower portion of sleeve 74 thus disengaging ball element 64.

FIG. 19 shows ball-bearing elements 75 located within sleeve 74. As will be seen, collar 76 is in surrounding relationship thereto. Elements 75 are free to move between the inner and outer peripheries of sleeve 74. Elements 75 are positioned towards the inner periphery of sleeve 74 when the collar 76 is in its lower position, FIG. 17, and are positioned towards the outer periphery of sleeve 74 when the collar 76 is in its upper position, FIG. 18.

While the above invention has been described in regard to a trailer adapted to be towed by two-wheel vehicles, it should be apparent that the trailer assembly described herein may be equally trailered by three, four or multi-wheel vehicles as well. Thus, the disclosed trailer may be adapted to be towed by tricycles, tractors or lawnmowers, for example.

Although specific embodiments have been described in detail hereinbefore, it is understood that the subject invention is not limited thereto, and all obvious variations and modifications thereof are contemplated and are included within the spirit and scope of the invention as defined in the appended claims.

What is claimed is:

1. A trailer assembly towable by a bicycle and the like comprising:

a bed section for supporting a portable load and having a single axle portion located perpendicular to the course of travel of said trailer assembly, said bed section including front, rear, bottom and side walls, the rear wall of said bed section sloping away from said front wall, an axle bracket member for attachment to the bed section, said axle being located within the bracket member, said bracket including a plurality of V-shaped sections for absorbing shock, a pair of wheel members each rotatably mounted at one end of said axle portion of said bed section, a draw bar member rigidly connected at one end to said bed section and having a goose-neck configuration with a socket connector portion at the other end of said draw bar member, said draw bar member including a pair of elongated members extending upwardly of said bed section and terminating in an extended and elongated third member of said goose-neck configuration, a hitch assembly having a ball portion releasably mated with said socket connector portion of said draw bar member and further having provision for interconnecting with said bicycle to position said ball portion above the rear wheel and aft of the seat of said bicycle, said ball portion of the hitch assembly further being positioned forward of the rear axle of said bicycle, said hitch assembly including brace means for interconnecting with said bicycle, said ball portion being in an upward thrusting position with respect to said brace means, and kick-stand means attached to said bed section for supporting said bed section in a generally level plane, means for mounting said kick-stand means for pivotal movement with respect to said bed section, means for maintaining said kick-stand in a substantially vertical plane including locking means extending between said kickstand and said bed section, means for maintaining said kickstand in a position substantially parallel to the bottom of said bed section, said kick-stand being constructed of a length of tubing formed into a closed loop of rectangular configuration.

2. A trailer assembly according to claim 1, including means for releasably attaching said draw bar member to said bed section, and a handle bar member releasably attached to said bed section.

3. A trailer assembly according to claim 1, including a pair of seat members located within said bed section, and means for removably mounting the pair of seat members with respect to said bed section.

4. A trailer assembly according to claim 1, and including a holding bar member associated with one side wall of the bed section, and means for mounting one end of the bar member for pivotal movement between said one side wall and the other side wall of the bed section.

5. A trailer assembly according to claim 4, including means for maintaining said bar member in attaching relationship to said other side wall.

* * * * *